US012540487B2

(12) United States Patent
Wardi et al.

(10) Patent No.: US 12,540,487 B2
(45) Date of Patent: Feb. 3, 2026

(54) CATCH

(71) Applicant: EMKA BESCHLAGTEILE GMBH & CO. KG, Velbert (DE)

(72) Inventors: Florian Wardi, Velbert (DE); Thorsten Kuhnke, Velbert (DE); Andreas Kuhnen, Velbert (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 362 days.

(21) Appl. No.: 17/781,549

(22) PCT Filed: Dec. 1, 2020

(86) PCT No.: PCT/DE2020/101013

§ 371 (c)(1),
(2) Date: Sep. 23, 2022

(87) PCT Pub. No.: WO2021/110212

PCT Pub. Date: Jun. 10, 2021

(65) Prior Publication Data

US 2023/0022439 A1 Jan. 26, 2023

(30) Foreign Application Priority Data

Dec. 6, 2019 (DE) ..................... 10 2019 133 355.5

(51) Int. Cl.
*E05B 63/00* (2006.01)
*E05B 15/02* (2006.01)
(Continued)

(52) U.S. Cl.
CPC ........... *E05B 15/024* (2013.01); *F16M 13/02* (2013.01); *E05C 3/004* (2013.01); *E05C 3/041* (2013.01)

(58) Field of Classification Search
CPC ... Y10T 292/68; Y10T 292/705; E05B 15/02; E05B 15/024; E05B 15/0205; E05C 9/1808
See application file for complete search history.

(56) References Cited

U.S. PATENT DOCUMENTS

| | | | | |
|---|---|---|---|---|
| 2,041,625 A * | 5/1936 | Schmidt | .............. | E05B 15/0205 292/346 |
| 2,990,211 A * | 6/1961 | Wartian | ................ | E05B 15/024 292/341.18 |

(Continued)

FOREIGN PATENT DOCUMENTS

| | | |
|---|---|---|
| CH | 379947 A * | 7/1964 |
| DE | 3308319 | 9/1984 |

(Continued)

OTHER PUBLICATIONS

Translation of DE 29512852.*

(Continued)

*Primary Examiner* — Carlos Lugo
(74) *Attorney, Agent, or Firm* — Thompson Hine LLP

(57) ABSTRACT

In an exemplary embodiment, a locking holder with a mounting element in which the locking holder can be fastened to a door frame in a mounting plane, and with a holding surface which is arranged spaced apart with respect to the mounting plane and can be engaged behind by a door-side locking latch in order to lock the door, the holder includes a holding shoe which can be fastened releasably to a holding element in order to set the distance of the holding surface with respect to the mounting plane.

17 Claims, 11 Drawing Sheets

(51) Int. Cl.
*F16M 13/02* (2006.01)
*E05C 3/00* (2006.01)
*E05C 3/04* (2006.01)

(56) References Cited

U.S. PATENT DOCUMENTS

| | | | | |
|---|---|---|---|---|
| 3,179,458 A * | 4/1965 | Sconzo | E05B 15/0245 292/341.15 |
| 3,469,877 A * | 9/1969 | Hutchison | E05B 15/025 292/241 |
| 4,288,120 A * | 9/1981 | Moore | E05B 15/025 292/341.18 |
| 5,613,718 A * | 3/1997 | Lin | E05B 17/2003 292/341.15 |
| 6,267,421 B1 | 7/2001 | Burton | |
| 2021/0115700 A1 | 4/2021 | Wardi | |

FOREIGN PATENT DOCUMENTS

| | | | |
|---|---|---|---|
| DE | 29512852 U1 * | 12/1995 | |
| DE | 100 65 890 | 7/2002 | |
| DE | 699 09 218 | 4/2004 | |
| DE | 10 2014 100 487 | 7/2015 | |
| DE | 202015102101 U1 * | 7/2015 | E05B 15/0205 |
| DE | 10 2018 102 286 | 8/2019 | |
| DE | 10 2018 103 737 | 8/2019 | |
| EP | 3760818 A1 * | 1/2021 | E05B 15/024 |
| FR | 1333904 | 8/1963 | |
| FR | 2400100 A1 * | 3/1979 | |
| FR | 2516969 A1 * | 5/1983 | |
| NL | 1017803 | 10/2002 | |
| WO | WO-2019199066 A1 * | 10/2019 | E05B 15/024 |

OTHER PUBLICATIONS

International Preliminary Report on Patentability pertaining to PCT Application No. PCT/DE2020/101013, 6 pages, Jun. 16, 2022.

European Patent Office (ISA/EP), International Search Report (with English translation), International Application No. PCT/DE2020/101013, 5 pages, Mar. 1, 2021.

* cited by examiner

CATCH

TECHNICAL FIELD

This disclosure relates to a locking holder with a mounting element, via which the locking holder can be fastened to a door frame in a mounting plane, and with a holding surface which is arranged spaced apart with respect to the mounting plane and can be engaged behind by a door-side locking latch in order to lock the door.

BACKGROUND

Locking holders are used in the case of openings of closable configuration. There, as part of a lock, they make locking of doors, hatches or windows to a frame which surrounds the respective opening possible. In the following text, reference is made to a door representatively for these different elements.

The locking holders as a rule have a mounting element, via which the locking holder can be connected to the door frame in a mounting plane, for example via a screw connection. The mounting plane of the mounting element is then identical to that surface of the door frame, on which the locking holder or the mounting element is fastened.

Furthermore, a holding surface which is arranged spaced apart with respect to the mounting plane is provided, with the result that an intermediate space arises between the mounting plane and the holding surface. If the door is then to be locked, a door-side locking latch of the lock, for example a rotatable turn bolt tongue, can be moved into this intermediate space, with the result that the locking latch engages behind the holding surface. In this position, the door is then fixed with respect to the door frame and can no longer be moved. In order then to open the door again, the locking latch has to be moved back into a position, in which the holding surface is no longer engaged behind.

It is often desirable that seal elements, for example in the form of sealing profiles or sealing beads, are provided between the door and the door frame, for example in order to decrease a gas exchange and to prevent associated heat losses and/or air losses. It is therefore necessary that, in the closed position, the door deforms the corresponding sealing profiles and exerts a certain contact pressure on the seal elements.

After a relatively long use or else on account of manufacturing tolerances, it can occur that the seals are not deformed to a sufficient extent by the door and it is therefore necessary for the closed position of the door to be adapted. A corresponding adaptation can be realized, for example, by way of a setting of the spacing of the holding surface with respect to the mounting plane. This is because the smaller the corresponding spacing, the closer the door lies to the doorframe in the locked position and the higher also the contact pressure of the door.

Reference document No. DE 10 2018 103 373 proposes, for example, for the holding surface to be moved with respect to the mounting plane via an adjusting mechanism. Although this apparatus makes an infinitely variable spacing setting possible, it is necessary for adjustment purposes for two screws to be released or tightened in parallel. Although this type of actuation has certainly proven itself in the past, it can occur in the case of incorrect use, when the two screws are not moved uniformly, that the elements tilt.

Proceeding herefrom, it is the object of the invention to specify a locking holder which permits simpler adjusting of the distance.

SUMMARY

In the case of a locking holder of the type mentioned at the outset, this object is achieved by virtue of the fact that a holding shoe is provided which can be fastened releasably to a holding element in order to set the distance of the holding surface with respect to the mounting plane.

Via the holding shoe, the distance of the holding plane with respect to the mounting plane can be set and varied in a very simple way. The releasable arrangement of the holding shoe on a holding element makes extremely rapid mounting and dismantling possible, with the result that the spacing between the holding surface and the mounting plane can be set in a rapid and uncomplicated manner, even by unskilled staff.

With regard to the connection of the holding shoe to the holding element, it has been shown to be advantageous if the holding shoe can be plugged onto the holding element. As a result of plugging on, the holding shoe can be connected to the holding element or else released again from the holding element very simply and without the use of a tool. The holding shoe can be plugged onto the holding element from a mounting direction, and can correspondingly be removed again from the holding element counter to the mounting direction, it being possible for the mounting direction to be oriented here parallel to the mounting surface. Furthermore, the mounting direction can be arranged substantially transversely with respect to the longitudinal extent of the holding element, with the result that the holding shoe can essentially be plugged onto the holding element from the direction of the locking latch or from the direction of the rotational axis of the locking latch. As an alternative, however, plugging on is also possible from the opposite direction.

The holding shoe can be latched to the holding element in the connected or plugged-on position, with the result that a reliable connection of the holding shoe to the holding element is ensured and the holding shoe cannot unintentionally slip off the holding element. Furthermore, it is also possible that the holding shoe can be clipped onto the holding element. As a result, a self-locking secure connection is also provided which can also be released again without a tool. As an alternative, however, it is also possible for the holding shoe to be connected to the holding element, for example, via a screw connection.

In order for it to be possible for the distance between the holding surface and the mounting plane to be set in a variable manner, it has been shown to be advantageous if the holding shoe can be fastened to the holding element in two different mounting positions in order to set the distance. Here, each mounting position can be assigned a specific distance, with the result that the change in the distance of the holding surface with respect to the mounting plane can also be set by way of the change in the mounting position. Therefore, each mounting position can then also be assigned a predefined door position in the closed position, and/or the contact force which acts on the sealing elements can be dependent on the mounting position of the holding shoe.

With regard to the two mounting positions, it has been shown to be advantageous if the holding shoe is rotated in one mounting position by 180 degrees in relation to the other mounting position. It is therefore very simple to change to and fro between the two mounting positions and therefore to set the distance rapidly. A holding shoe which is fastened to the holding element merely has to be removed by the holding element, then has to be turned by 180°, and then has to be fastened to the holding element again. This is a working step which can be carried out in a highly intuitive manner and does not require comprehensive instruction.

Furthermore, it has been shown to be advantageous if the distance of the holding surface with respect to the mounting plane is smaller in the first mounting position than in the second mounting position. In the first mounting position, therefore, the locking latch can bear more closely against the mounting plane and, as a result, also more closely against the door frame, as a result of which the contact force which acts on the seal arranged between the door and the door frame is comparatively great. Although a great contact force is essentially positive for ensuring a reliable seal of the door, it is accompanied by it being possible for the door to be closed only with great difficulty. In the second mounting position, in contrast, the distance is greater than in the first mounting position, with the result that, in this position, the door can be closed more simply, but the seal is then possibly not compressed to quite as pronounced an extent as in the first mounting position. The selection of the mounting position therefore has to be made in a manner which is dependent on several factors. In addition, manufacturing tolerances can also be compensated for via the various mounting positions. Furthermore, it is conceivable that the holding shoe is mounted first of all in the second mounting position, but it is then necessary, for example on account of aging phenomena of the sealing elements, for it to be compressed to a more pronounced extent after a relatively long service life, in order to maintain a reliable sealing action. In this case, the holding shoe can then be removed from the holding element, rotated by 180 degrees, and then plugged onto the holding element again in the first mounting position.

With regard to the orientation of the holding surface, it has proven to be advantageous if the holding surface and the mounting plane are arranged parallel to one another. This makes it possible for the locking latch also to rest as fully as possible on the holding plane in the locking position, which ensures good force transmission and thus secure support of the locking latch. The holding surface can also be arranged parallel to the surface of the door frame. Furthermore, full-area contact of the locking latch on the holding surface or on the holding shoe also avoids the locking latch tilting or it unintentionally pulling the holding shoe from the holding element in the case of a movement, in particular into the unlocked position. It is not absolutely necessary for the holding surface to be a flat surface, but rather the holding surface may, for example, also be curved in sections.

With regard to the setting, it has proven to be advantageous if the distance of the holding surface with respect to the mounting plane can be set in the perpendicular direction. The perpendicular direction lies perpendicularly on the mounting plane, with the result that, in the case of a change in the distance of the holding surface with respect to the mounting plane, each point of the holding surface is moved away from the mounting plane uniformly.

In a structural regard, it has proven to be advantageous if the holding shoe has two limbs of different thickness. The distance of the holding surface with respect to the mounting plane can be set via the thickness of these two limbs. The thicker limb can face the mounting plane in the first mounting position, and the thinner limb can face the mounting plane in the second mounting position. The two limbs can extend parallel to one another and, if the holding shoe is connected to the holding element, one limb can be arranged on that side of the holding element which faces away from the mounting plane and one limb can be arranged on that side of the holding element which faces the mounting plane. The holding surface can be in each case that surface, on which the locking latch slides in the locked position, or that surface of the limb of the holding shoe which faces the mounting plane.

Furthermore, the surfaces of the limbs can be configured as sliding surfaces, with the result that the locking latch can slide on these surfaces in the case of locking or unlocking. The locking latch always slides, in the case of the locking and unlocking, on the surface of the limb which faces the mounting plane in the corresponding mounting position and which therefore defines the distance from the mounting plane. Furthermore, it has proven to be advantageous if the holding shoe has a U-shaped cross section. A corresponding cross section allows it to be possible for the holding shoe to be plugged onto the holding element from one direction and to engage around the holding element, in particular in a positively locking manner.

In a development of the invention, it is furthermore proposed that the holding element is connected to the mounting element via two supports. The holding element can be arranged spaced apart from and parallel to the mounting element via these two supports such that the holding element together with the two supports substantially has a C-shaped contour. The two supports can be arranged perpendicularly to the mounting plane and perpendicularly to the holding surface such that the holding surface also runs parallel to the mounting plane. The two supports can be connected to the holding element at the respective edge regions of the latter such that enough space remains between the two supports, and the door-side locking latch can engage behind the holding element or the holding surface during a rotational movement.

With regard to the configuration of the holding shoe, it has proven to be advantageous if the latter has at least one spring arm, via which the holding shoe can latch to the holding element and/or the support or supports. The holding shoe can thus be releasably connected to the holding element via the spring arm and held securely thereon. However, in order to ensure an even distribution of force, at least two spring arms have proven to be advantageous in practice. The spring arm(s) can each have one or more latching lugs, which ensure that the spring arm(s) deform automatically when the holding shoe is pushed onto the holding element and then automatically engage behind the holding element or the supports when the end position is reached. The spring arms and the latching lugs are advantageously configured in such a way that the holding shoe can also then be removed from the holding element again without the additional use of a tool. The spring arms can be arranged on the side of the holding shoe and can grip like a clamp around the holding element and/or the supports in the mounting positions. Furthermore, it is also possible that the holding shoe is connected to the holding element and/or the supports via a screw connection.

In a further development of the invention, it has proven to be advantageous if the holding shoe has four spring arms. One spring arm can be arranged on each side of the limb. The four spring arms can have latching lugs that all point in one direction. In the mounting position, the latching lugs of two spring arms can in each case engage behind the holding element, in particular the latching lugs of the spring arms, which are arranged on the side of the narrower limb.

So that the holding shoe can be reliably connected to the holding element, the holding element can have a guide for the holding shoe. The guide can prevent the holding shoe from snagging or tilting as it is being pushed onto the holding element, which in this respect simplifies the mounting and dismantling of the holding shoe even further. The guide can comprise two guide webs, which are used for linear guidance of the holding shoe. The holding shoe can be arranged between these two webs in the connected position. The guide has proven to be particularly advantageous when the holding shoe has four spring arms and/or when the holding shoe is shorter than the holding element.

However, it is furthermore also possible for the holding shoe to extend over the entire length of the holding element. In this case, an additional guide on the holding element is not absolutely necessary, but the spring arms, which can grip around the holding element and/or the supports laterally, can serve to correspondingly guide the guide shoe relative to the holding element.

In one development of the invention, the holding shoe can have a receptacle for receiving a stop at least in sections. Via the receptacle, the stop can be connected releasably to the locking holder or to the mounting element and/or the holding element, with the result that the holding shoe in this respect serves as a holding apparatus for the stop. The receptacle can be arranged between the spring arm or arms and the limbs, and can be configured in the manner of a slot.

The stop can be configured as a repositionable stop and can be connected releasably to one of a plurality of stop receptacles. Via the holding shoe, the stop can be held reliably in the stop receptacle, with the result that the holding shoe is to this extent given a dual function.

Furthermore, it has proven to be advantageous if the holding element is connected in one piece to the supports and to the mounting element. The holding element, the supports and the mounting element can therefore be produced in one working step and can be configured, for example, as an injection molded part. This makes simple and inexpensive mass production possible.

With regard to the holding shoe, it has proven to be advantageous if it is produced from plastic, in particular from a POM plastic compound. The locking holder can therefore also be produced inexpensively and in high quantities using an injection molding method. POM plastic has the advantage that it has highly satisfactory sliding properties, with the result that material abrasion does not occur during swiveling in of the locking latch in order to lock the door or during swiveling out of the locking latch in order to unlock the door. Since the locking latch is as a rule subjected to comparatively great forces, it is as a rule produced from metal, in particular from galvanized steel. If material abrasion occurred, the zinc layer which protects the steel might be abraded, and corrosion might then occur. This is prevented by way of a correspondingly satisfactory sliding property of the holding shoe. To this extent, the locking holder is then also suitable, for example, for use in the offshore field. In addition to plastics, brass or bronze which likewise have satisfactory sliding properties can also be used, for example. A surface coating of the holding shoe with a slidable material would also be possible.

With regard to the object mentioned at the beginning, a lock with a locking holder which is configured in the manner described above is also proposed. The advantages already described with regard to the locking holder are afforded. Furthermore, a door with a lock which has a corresponding locking holder is proposed.

BRIEF DESCRIPTION OF THE DRAWINGS

Further details and advantages of the invention are to be explained in more detail below with reference to the accompanying drawings of one exemplary embodiment. In the drawings.

DETAILED DESCRIPTION

Figure 7:
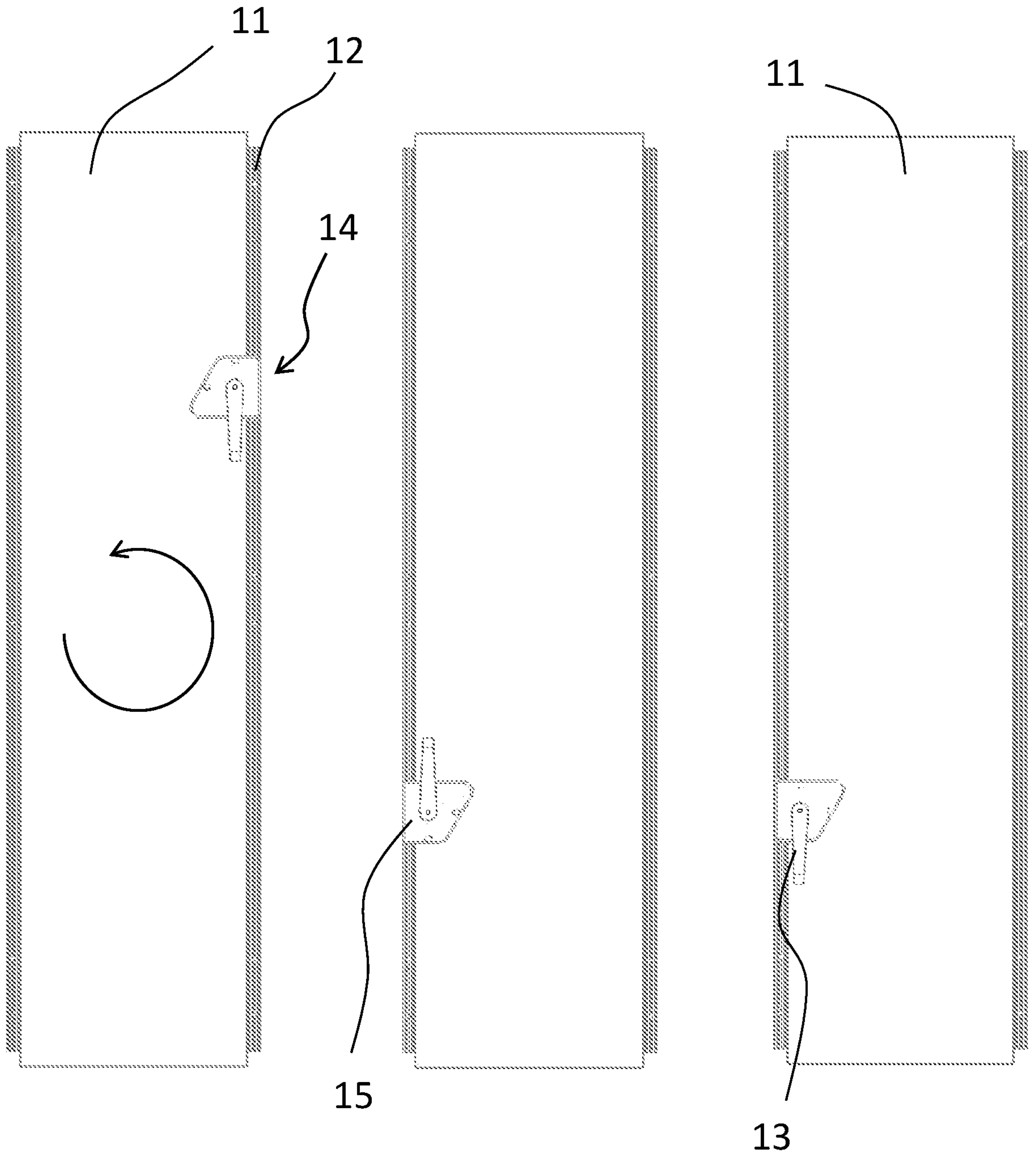
FIG. 7 shows a door arranged in various orientations on a door frame.

In order to fix a door 11 in relation to a door frame 12 such that the door 11 cannot be opened, a lock 14 with a frame-side locking holder 10 and a door-side locking latch 7 is provided, see FIG. 7. The locking latch 7 is rotatably mounted in a latch housing 15 and can be rotated to and fro between a locking position V and an unlocking position E. In the locking position V, the locking latch 7 engages in the locking holder 10 such that the door 11 is fixed relative to the frame 12 and can no longer be opened. In order to open the door 11, the locking latch 7 must first be rotated back again into an unlocking position E, in which the locking latch 7 no longer engages in the locking holder 10. The rotation of the locking latch 7 from the locking position V into the unlocking position E will be explained in more detail below with reference to FIGS. 14*a* to *d.*

Figure 1:
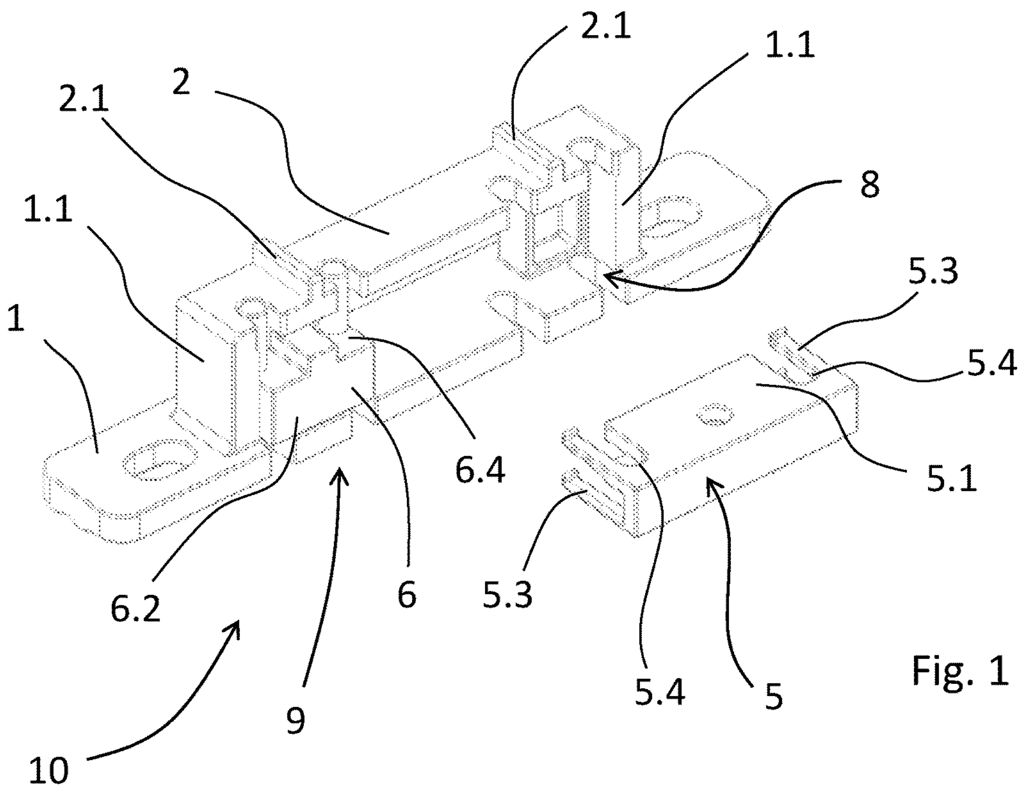
FIG. 1 shows a locking holder in a perspective side view.

First of all, the configuration of the locking holder 10 will now be described with reference to the illustration in FIG. 1. The locking holder 10 has a mounting element 1 which is configured in the manner of a base plate and via which the locking holder 10 can be connected to the frame 12 of a door 11. For this purpose, the elongate mounting element 1 has a bore in the form of a slot on each side, via which the mounting element 1 can be screwed to the door frame 12. Owing to the configuration as a slot, the mounting element 1 can still be displaced within certain limits, even if it is already connected to the frame 12 by screws, as long as the screws are not yet tightened. After the alignment of the mounting element 1, the screws are then tightened, and therefore a substantial movement of the mounting element 1 relative to the frame 12 is then no longer possible. The locking holder 10 can thus be fastened to the door frame 12 in a mounting plane M via the mounting element 1. The mounting plane M then also corresponds to the plane of the surface of the door frame 12, on which the locking holder 10 is mounted.

Furthermore, the locking holder 10 has a holding element 2, which is connected to it via two supports 1.1. Since the two supports 1.1 are at the same height and are arranged perpendicularly on the mounting element 1, the holding element 2 extends substantially parallel to the mounting element 1 or to the mounting plane M.

To lock the door 11, the locking latch 7 is now rotated into the intermediate space between the mounting plane M or the mounting element and the holding element 2 such that the locking latch 7 can no longer be moved in the vertical direction with respect to the mounting plane M and the door 11 is fixed relative to the frame 12. The position of the holding element 2 or the distance between the holding element 2 and the mounting plane M thus defines the closed position of the door 11.

A door seal is arranged between the door 11 and the frame 12, but this is not shown in the figures. Said door seal is compressed in the closed position of the door 11 such that the door 11 does not rattle and is not movable in the closed position. In addition, the seal can also ensure that gas exchange between the interior and the exterior is prevented or at least reduced. Owing to the compression of the seal, the latter exerts at least a certain force on the door 11 in the direction of the open position and thus presses the locking latch 7 from the direction of the mounting element 1 onto the holding element 2. The side of the holding element 2 which faces the mounting plane M then acts as a holding surface 3 on which the locking latch 7 rests in the locked position.

A holding shoe 5 is also provided in order to compensate for manufacturing tolerances or possibly also signs of aging of the seals. The function and the configuration of the holding shoe 5 will be described in more detail below, in particular with regard to FIGS. 1 to 6.

The holding shoe 5 is connected releasably to the holding element 2, and can be pushed onto the holding element 2 from the front in a mounting direction MR which is oriented parallel to the mounting plane M. The intermediate space which is situated between the holding element 2 and the mounting element 1 is decreased in size by way of the holding shoe 5, which correspondingly also leads to a displacement of the holding surface 3 in the direction of the mounting plane M. The holding shoe 5 therefore leads to the locking latch 1 being situated in the locking position V closer to the mounting plane M and therefore also closer to the door frame 12. Accordingly, the door 11 is also pressed onto the seal to a more pronounced extent in the closed position. As can be seen, furthermore, it is not necessary for the holding shoe 5 to be connected to the holding element 2 by means of a tool, but rather the holding shoe can simply be plugged onto the holding element 2 by hand and it then latches automatically to the holding element 2 and/or to the supports 1.1, which will be described in greater detail below.

Figure 3:
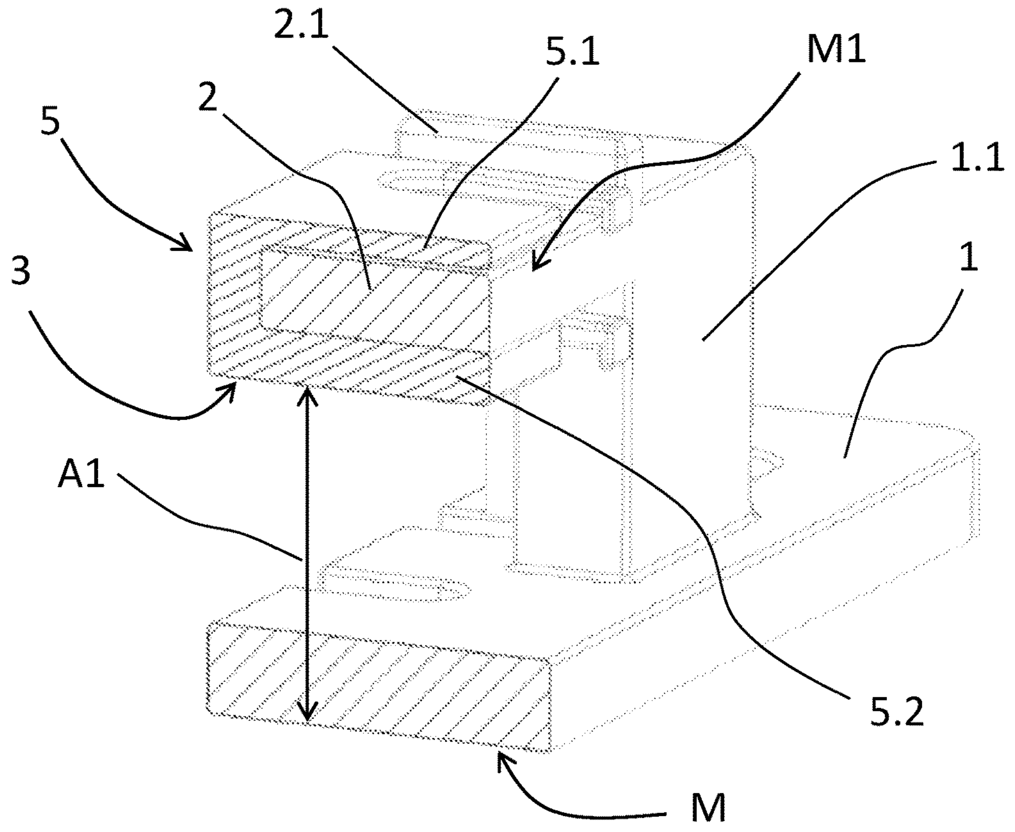
FIG. 3 shows a sectional view of the locking holder with a holding shoe in a first mounting position.
Figure 4:
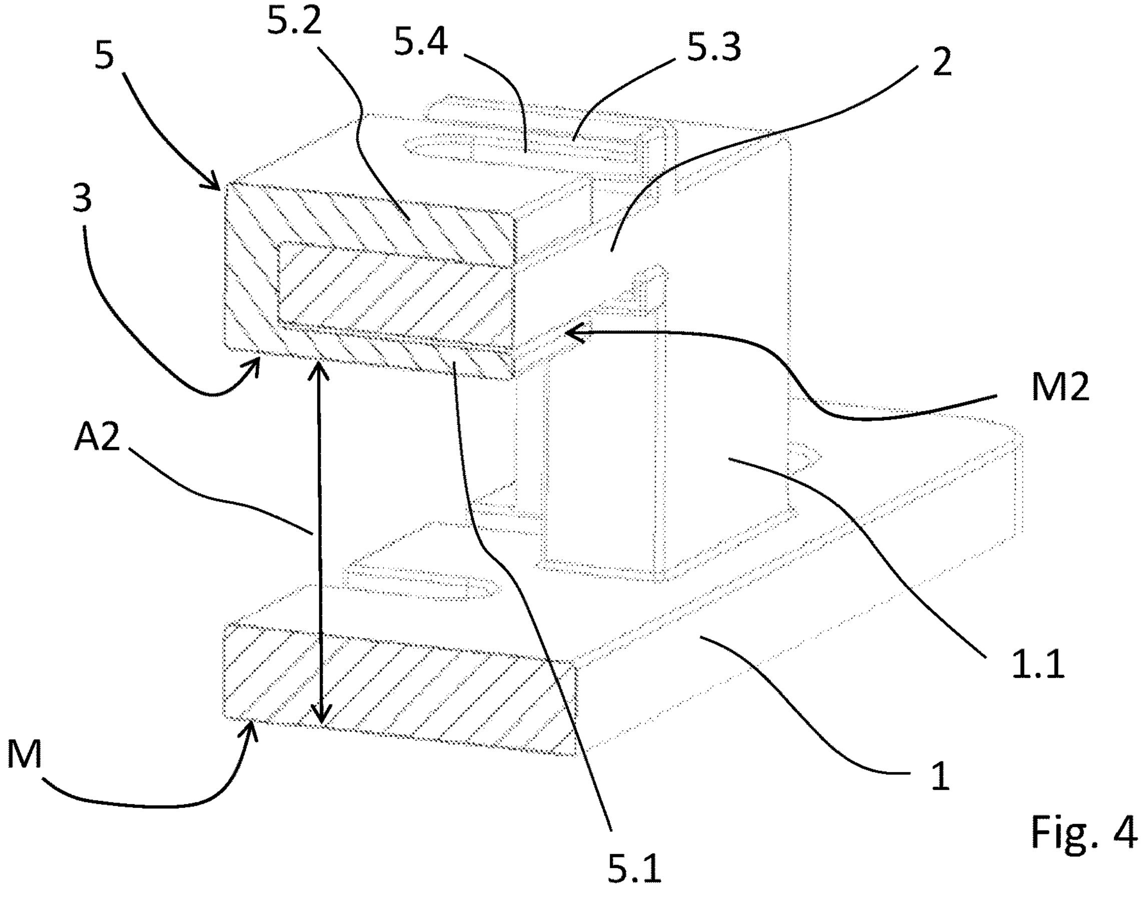
FIG. 4 shows the locking holder according to FIG. 3 in a second mounting position.

The holding shoe 5 can be connected in two different mounting positions M1, M2 to the holding element 2. The mounting position M1 is shown in the sectional view of FIG. 3, and the mounting position M2 is shown in the sectional view of FIG. 4. It can be seen, furthermore, that the holding shoe 5 comprises two limbs 5.1 and 5.2 which have a different thickness. Here, the limb 5.1 is considerably thinner than the limb 5.2, and the former has only approximately half the thickness of the limb 5.2. Both the illustration of FIG. 3 and the illustration of FIG. 4 show the same holding shoe 5 in different mounting positions M1, M2. Accordingly, the holding shoe 5 is plugged in one case onto the holding element 2 in such a way that the thicker limb 5.2 faces the mounting plane M, and is plugged on in one case the other way around, with the result that the thinner limb 5.2 faces the mounting plane M. The holding shoe 5 has therefore accordingly been rotated once by 180 degrees.

It can be seen, furthermore, that the distance A1, A2 of the holding surface 3 from the mounting plane M is also different in each mounting position M1, M2 as a result of the different limb thicknesses. The holding surface 3 in each case denotes that surface of the limb 5.1, 5.2, against which the locking latch 7 bears in the locked position, that is to say in each case that surface of the holding shoe 5 which faces the mounting plane M. By virtue of the fact that the thicker limb 5.2 faces the mounting plane M in the mounting position M1, the distance A1 of the holding surface 3 with respect to the mounting plane M is correspondingly also smaller than in the second mounting position M2. This also becomes clear in the case of a comparison of the two distances A1 and A2 in the different mounting positions M1 and M2 which are shown in FIGS. 3 and 4. The holding shoe 5 therefore provides the possibility of setting the distance between the holding surface 3 and the mounting plane M in three different steps. If no holding shoe 5 is used, the distance is greatest and the locking latch 7 engages behind the holding element 2 in the locking position V and then bears against it. If the holding shoe 5 is used in the first mounting position M1, the distance decreases in size to the distance A1 and, if the holding shoe 5 is used in the second mounting position M2, the distance decreases further in size to the distance A2.

Figure 2:
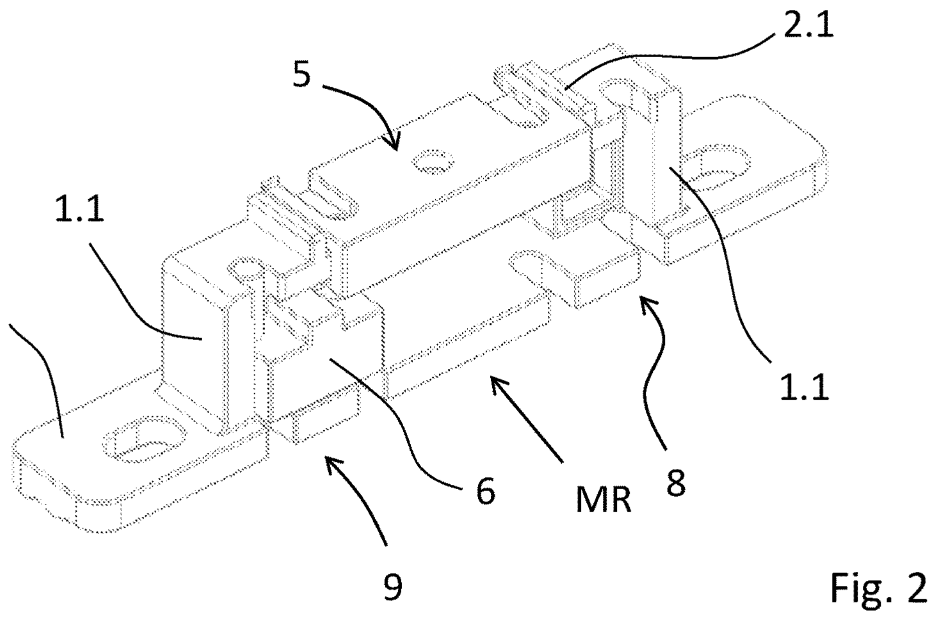
FIG. 2 shows the locking holder according to FIG. 1 with a pushed-on holding shoe.
Figure 5:
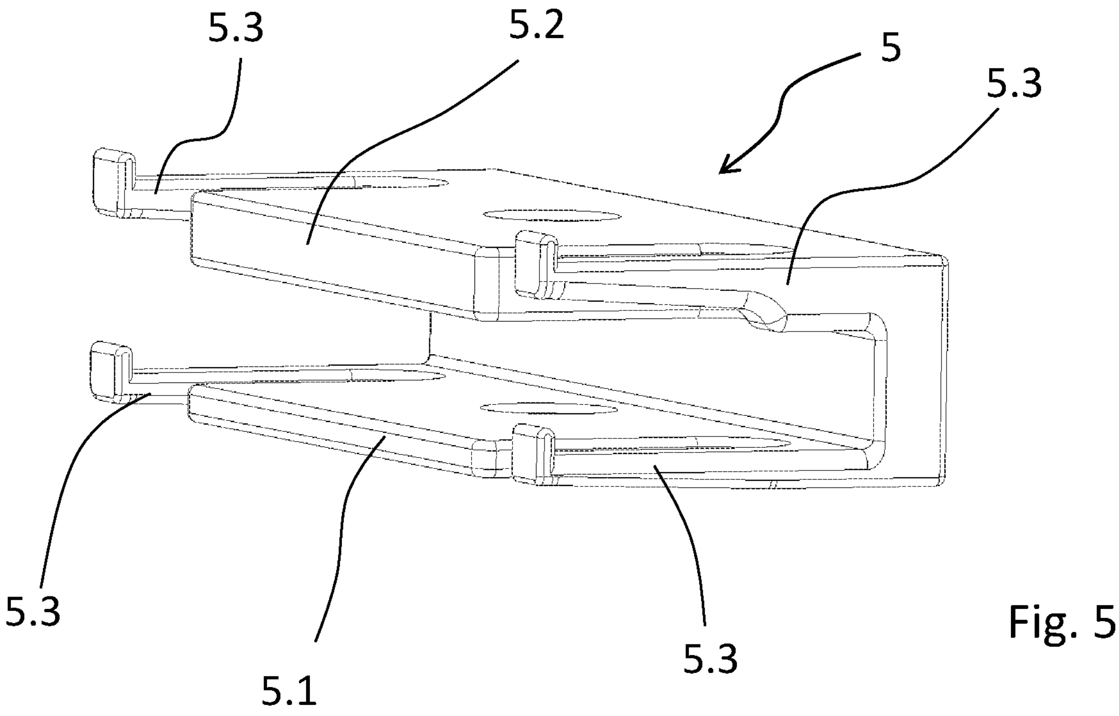
FIG. 5 shows a perspective side view of the holding shoe in a first embodiment.
Figure 6:
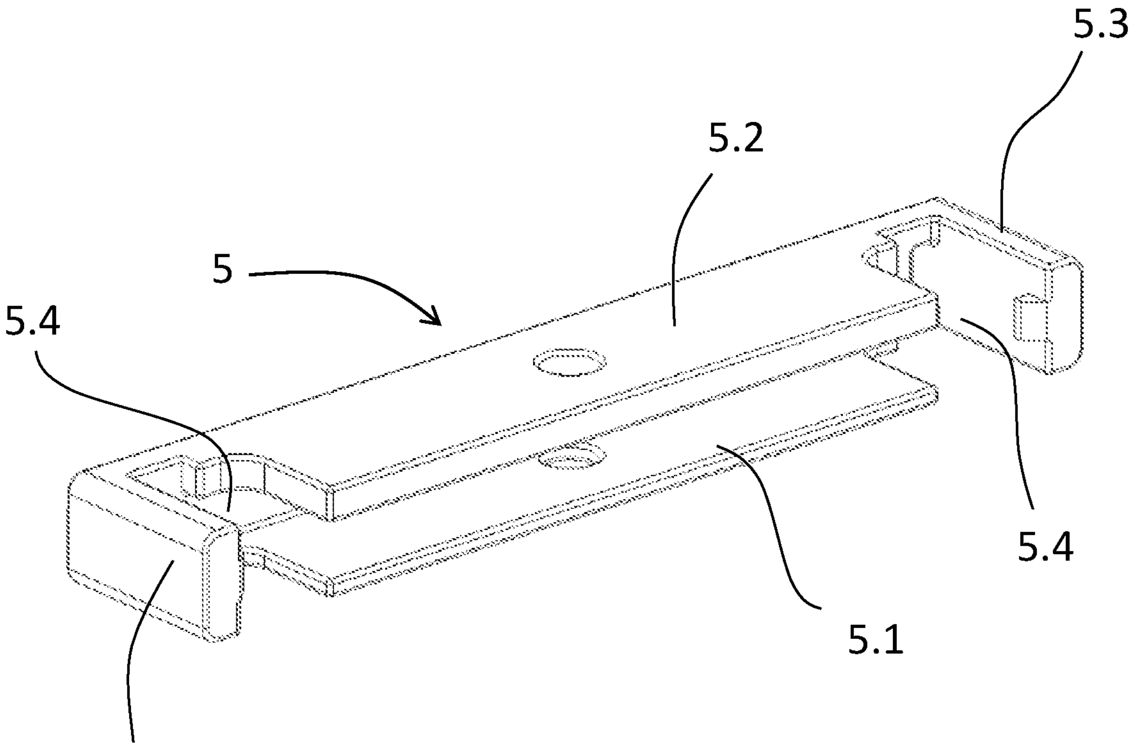
FIG. 6 shows a perspective side view of the holding shoe in a second embodiment.

FIGS. 5 and 6 then show two holding shoes 5 of different configuration. Here, the holding shoe 5 according to FIG. 5 corresponds to that which is also shown in FIGS. 1 and 2. The two limbs 5.1, 5.2 are parallel to one another and engage around the holding element 2 in the plugged-on position. In order that the holding element 5 can be plugged onto the holding element 2 as reliably as possible, the holding element 2 has a guide 2.1 which consists of two parallel webs, as can be seen in the illustration of FIG. 1. In the plugged-on position, the holding shoe 5 then lies between these two webs which in this regard 5 serve as a linear guide.

In order that the holding shoe 5 is held reliably on the holding element 2 even when the locking latch 7 is moved into the unlocking position E and in the process slides on the holding shoe 5, the holding shoe 5 has four spring arms 5.3, of which in each case one is situated on each side of the two limbs 5.1, 5.2. In order that the spring arms 5.3 can latch to the holding element 2, each spring arm 5 has a latching lug, of which, depending on the mounting position M1, M2 of the holding shoe 5, in each case two then engage behind the holding element 2, as can be seen in the illustration of FIGS. 3 and 4. Here, the latching lugs of all four spring arms 5.3 point in the same direction. Furthermore, the holding shoe 5 has receptacles 5.4 which extend between the spring arms 5.3 and the limbs 5.1, 5.2 and can be seen clearly in the illustration of FIG. 1. The function of these receptacles 5.4 will be described in greater detail below with regard to the stop 6.

Figure 10A:
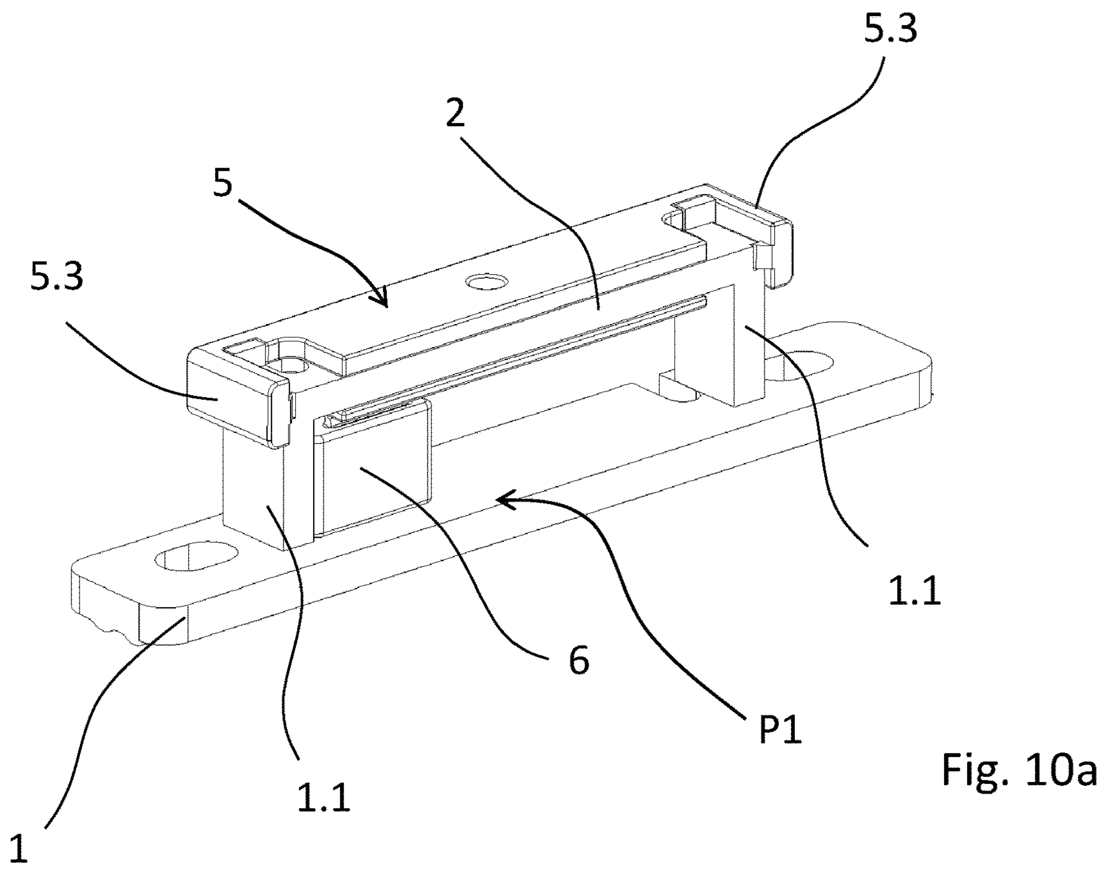
FIGS. 10*a* to 10*d* show perspective views of a locking holder with a stop in two different stop positions.
Figure 10B:
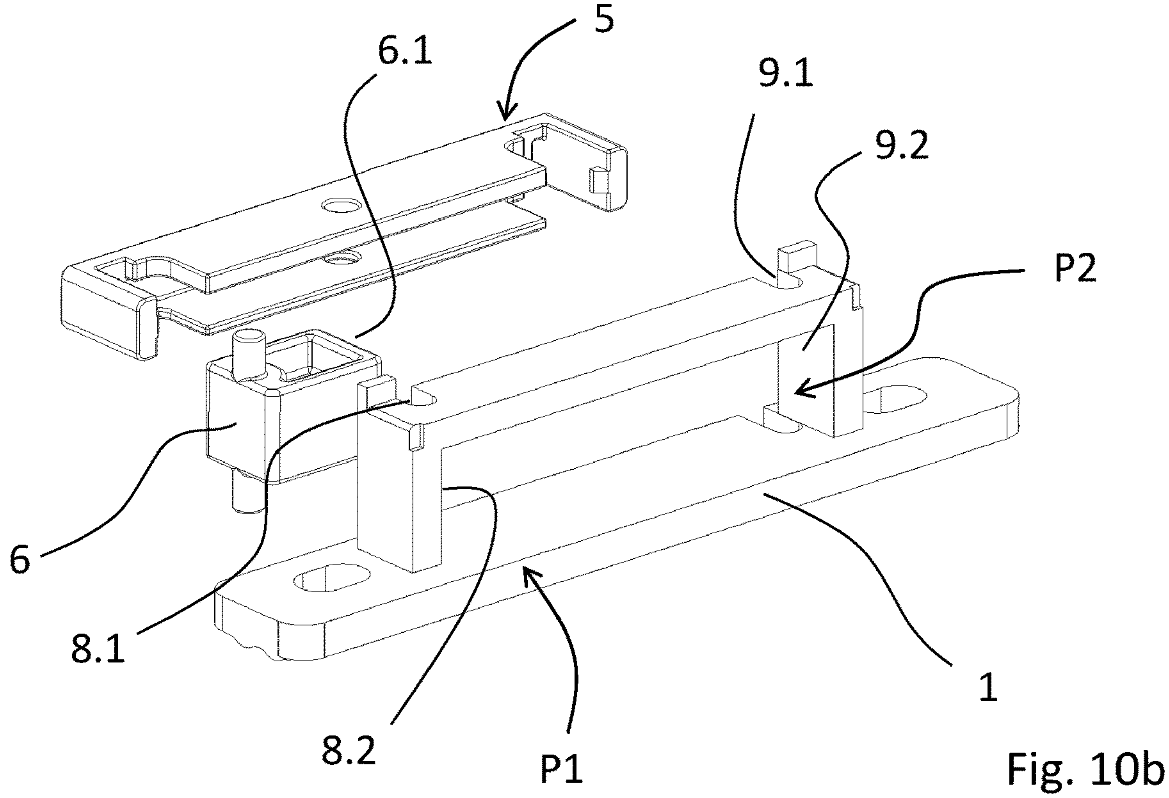
Figure 10C:
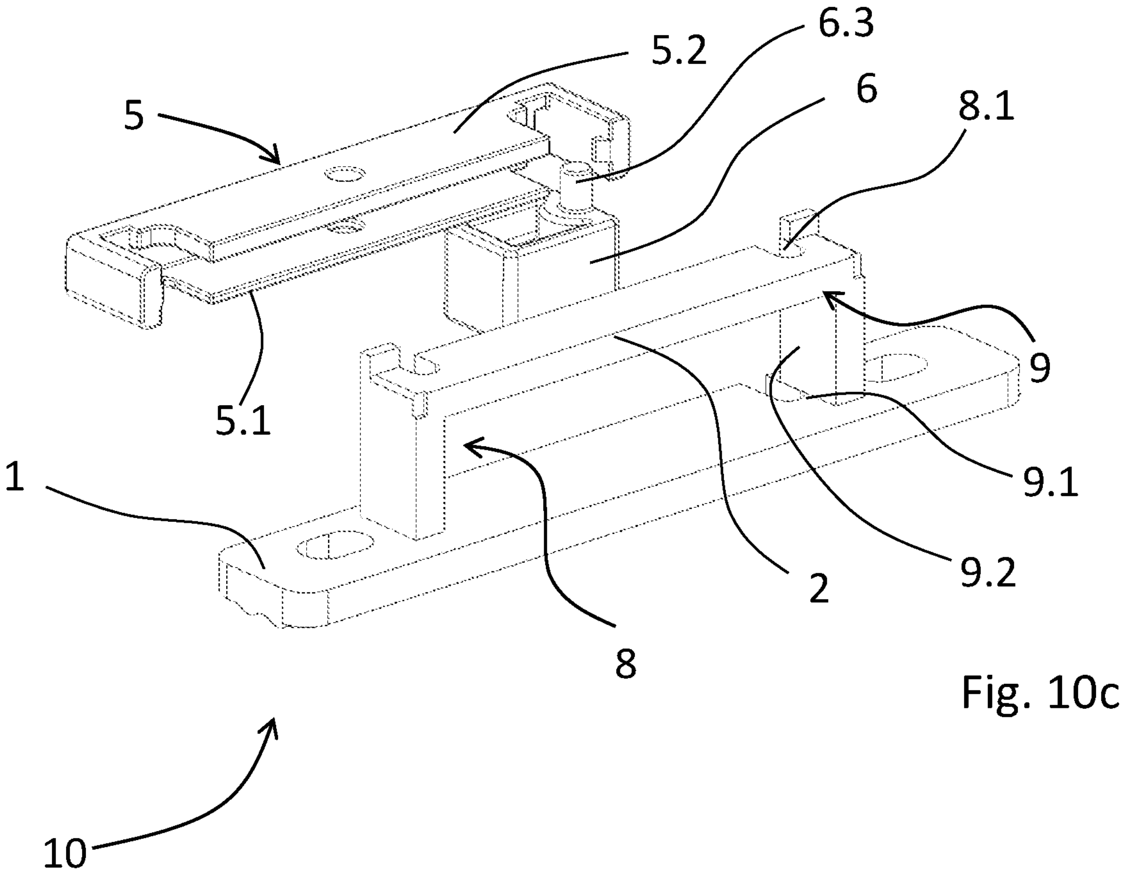

FIG. 6 shows the holding shoe 5 in a second embodiment. The limbs 5.1, 5.2 of this embodiment also extend parallel to one another, and engage around the holding element 2 from the top and from the bottom. In contrast to the holding shoe 5 according to FIG. 5, however, it is the case in this embodiment that the holding shoe 5 has only two spring arms 5.3 which extend over the complete height of the holding shoe 5. This holding shoe 5 is also longer, with the result that it can engage with the spring arms 5.2 around the complete holding element 2, as can be seen in the illustrations of FIGS. 10*a* and 10*b*. Since this holding shoe 5 is guided during plugging on via the spring arms 5.3 which bear laterally against the holding element 5 or against the supports 1.1, additional guidance 2.1 on the holding element 2 is not absolutely necessary in the case of this embodiment.

Furthermore, it can be seen in FIGS. 10*a* and 10*b* that the two spring arms 5.3 also in each case have a latching lug, which latching lugs face one another. These latching lugs engage around the holding element 2 or the supports 1.1, and then ensure, in an entirely analogous manner with respect to the spring arms 5.3 described with regard to the embodiment according to FIG. 5, that the holding shoe 5 is held securely on the holding element 2. In the case of this embodiment, furthermore, the holding element 2 has notches in the upper end region, into which notches the latching lugs of the spring arms 5.3 can engage. The corresponding notches can be seen in FIG. 10*b*, for example.

With regard to the material selection for the holding shoe 5, materials of the type which have satisfactory sliding properties have proven to be particularly advantageous in practice. This essentially has two reasons. The locking latches 7 have to have a high strength, and are therefore as a rule made from metal and, in order to prevent corrosion, usually from galvanized metal. Since the locking latch 7 then slides on this surface when engaging behind the holding surface 3, it can possibly occur that the galvanized surface of the locking latches 7 is abraded, which is then accompanied by an increased risk of corrosion. If the holding shoe 5 and, in particular, the corresponding surfaces of the holding shoe 5, on which the locking latch 7 slides, have satisfactory sliding properties, the risk of material abrasion decreases as a result.

Moreover, it can also occur that, in the case of an excessively high pressure of the locking latch 7 on the holding surface 3, the holding shoe 5 also moves the holding shoe 5 in the case of a rotation of the locking latch 7 into the unlocking position E, and therefore pulls this holding shoe 5 from the holding element 2. To this extent, satisfactory sliding properties also make it possible that the holding shoe 5 can be held securely on the holding element 2. Possible materials for the holding shoe 5 are, for example, plastic, in particular POM, brass or bronze. Furthermore, surface coatings can also be used to improve the sliding properties.

Even if the distance A1, A2 between the holding surface 3 and the mounting plane M and, via this, also the closing position of the door 11 with respect to the frame 12 can be set by way of the holding shoe 5, a problem arises, furthermore, if the door 11 is to be modified, for example from a left-hand stop to a right-hand stop.

A door 11 hinged on the left can be seen, for example, in the illustration on the left in FIG. 7. The door 11 has a lock 14 which fixes the door 11 in the locking position V relative to the frame 12 such that the door 11 can then no longer be opened. The corresponding lock 14 has a rotatable locking latch 7 and a locking holder 10, as has already been described above. The middle and the right-hand illustration of FIG. 7 now illustrate how the door 11 hinged on the left can be converted such that it is then hinged on the right.

First of all, for this purpose, the door 11 is completely released from the frame 12 and then rotated through 180 degrees. In doing so, the frame-side elements of the lock 14 must be released from the right-hand side of the frame 12 and then reassembled on the left-hand side of the frame 12. The same can also apply to the door hinges. If the door 11 has then been rotated through 180 degrees and fastened to the frame 12 again, it can be opened again, closed and also locked again via the lock 14. However, as is evident from a comparison of the right and middle illustrations in FIG. 7, when the door 11 is turned around, the orientation of the handle lever 13 also changes. This is because it now no longer points downward but rather upward, which is generally not desired. It will now be described below how the lock 14 can be converted without having to dismantle it or the handle lever 11.

Figure 8A:
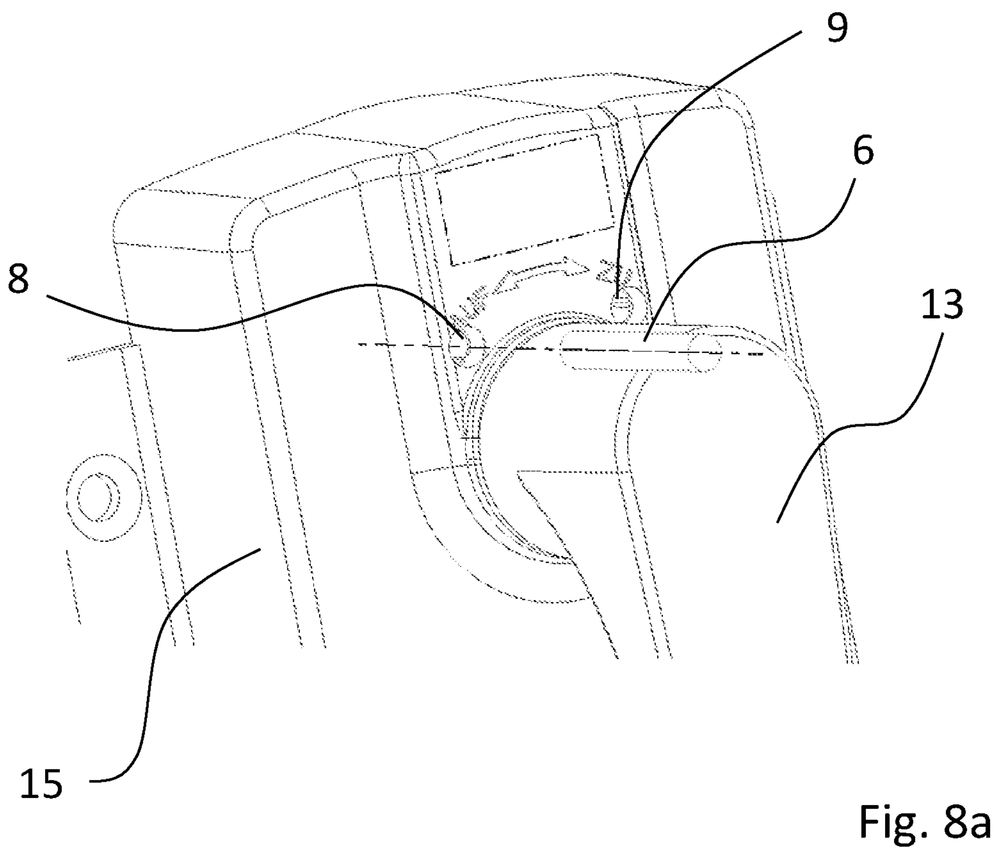
FIGS. 8*a* and 8*b* show perspective views of a latch housing of a lock with a stop in two different positions.
Figure 8B:
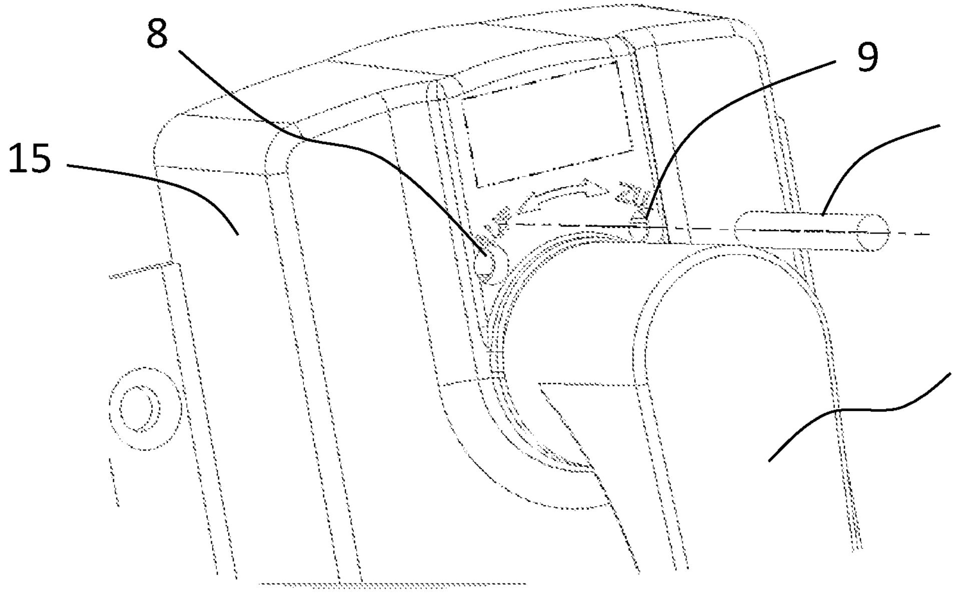

A first embodiment will first be described with reference to FIGS. 8*a, b* and 9*a, b*. FIGS. 8*a, b* show the latch housing 15 with the handle lever 13 arranged thereon, which is rotatably coupled to the locking latch 7 on the inside of the latch housing 15. The latch housing 15 has two stop receptacles 8, 9 which are configured as insertion openings and into which the stop 6 configured as a stop pin is selectively insertable. The inner workings of the latch housing 15 can be seen in FIGS. 9*a* and 9*b*. By positioning the stop 6 in the various stop receptacles 8, 9, a movement of the locking latch 7 can therefore be limited in different ranges of rotation.

Figure 9A:
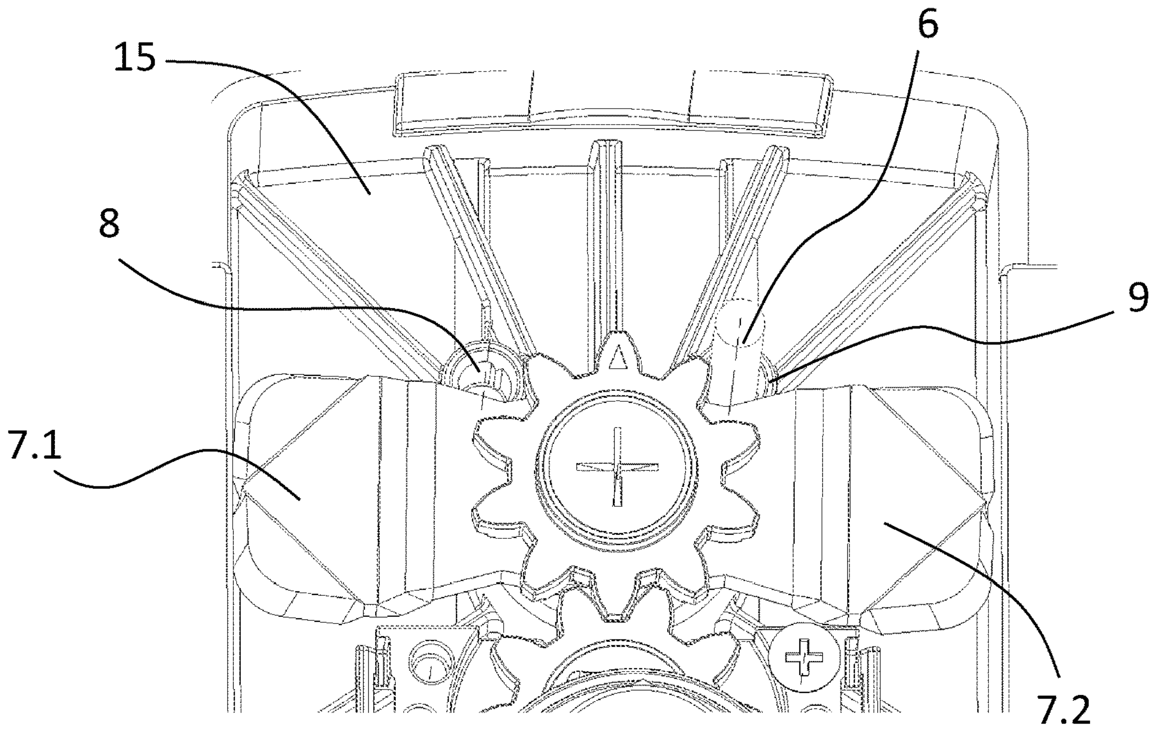
FIGS. 9*a* and 9*b* show sectional views through the latch housings according to FIGS. 8*a* and 8*b;*

The locking latch 7 is shown in a locking position V in FIG. 9*a*. The locking holder 10 is not shown. The locking latch 7 is configured as a double locking latch and has two mutually opposite locking elements 7.1 and 7.2. In the position according to FIG. 9*a*, the latch element 7.2 firstly rests against the stop 6 plugging in the stop receptacle 9 such that the locking latch 7 can only be rotated clockwise, but not counterclockwise, since the stop 6 prevents this rotational movement. If the locking latch 7 is now turned clockwise, the latch element 7.2 is pivoted out of the locking holder 10 (not shown) and the door 11 can be opened. The locking latch 7 can be rotated until the latch element 7.1 rests against the other side of the stop 6. The stop 6 thus prevents the handle lever 13 and thus also the locking latch 7 from being able to be rotated to an extent such that the latch element 7.1 engages in the locking holder 10.

Figure 9B:
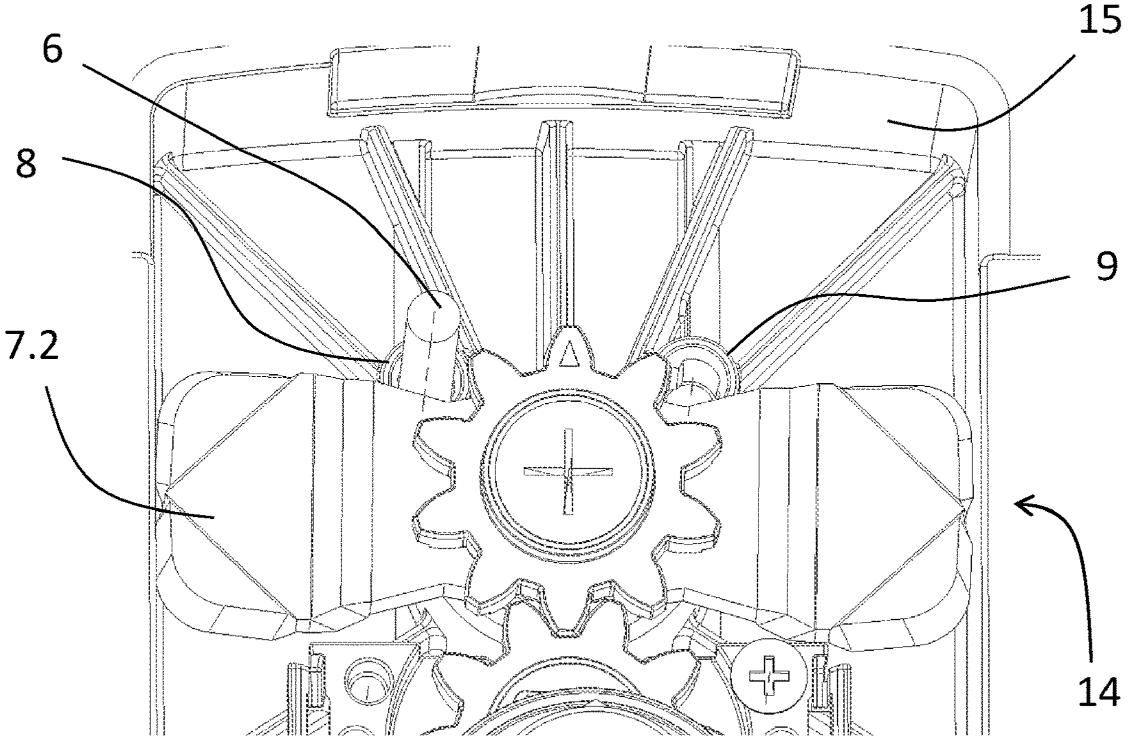

In the illustration of FIG. 9*b*, the stop 6 is inserted into the other stop receptacle 8. From this position, the locking latch 7 can now only be turned counterclockwise, and specifically only until the latch element 7.1 strikes against the right-hand side of the stop 6. Although the locking latch 7 is configured as a double locking latch in the illustrations of FIGS. 9*a* and 9*b*, the device also works to the same extent with locking latches 7 that have only one latch element 7.1. The only difference then is that the handle lever 13 can be pivoted by approximately 180 degrees further than in the embodiment with a double locking latch.

In order now to convert the door 11, for example, from a left-hand door stop to a right-hand door stop, the stop 6 must first be pulled out of the respective stop receptacle 8, 9. The handle lever 13 and the locking latch 7 can then be rotated freely such that the handle lever 13 can be rotated into the desired downwardly pointing position, as can be seen in the right-hand illustration in FIG. 7. In a next step, the stop 6 can then be inserted into the appropriate stop receptacle 8 or 9 and the holes arranged on the outside of the latch housing 15 can be closed, for example using caps.

As an alternative to the arrangement of the stop receptacles 8, 9 or the stop 6 on the latch housing 15, the stop receptacles 8, 9 can also be arranged on the locking holder 10. In this embodiment, the outside of the latch housing 15 no longer has to have insertion openings for the stop 6. This embodiment will be described below first of all with reference to the illustration in FIGS. 11 and 12. As can be seen in particular in FIG. 11, the locking holder 10 has two stop receptacles 8, 9 which are arranged on different sides of the locking holder 10 and which are substantially arranged between the mounting element 1 and the holding element 2. Both the holding element 2 and the mounting element 1 have in each case two recesses 8.1, 9.1 for each of the two stop receptacles 8, 9, which recesses extend in the manner of slots into the mounting element 1 and into the holding element 2 in the mounting direction MR. In this embodiment, the stop 6 has a total of four guide elements 6.3 which are configured in the manner of pins or bolts and which are guided in the recesses 8.1, 9.1 when the stop 6 is inserted into the respective stop receptacle 8, 9. The stop 6 is thus insertable selectively either into the stop receptacle 8 or into the stop receptacle 9 in the mounting direction MR and can accordingly also be removed again from the stop receptacles 8, 9.

The holding shoe 5 is used to fasten the stop 6 to the locking holder 10 and thus has a dual function. This is because the holding shoe 5 serves not only to adjust the distance A1, A2 of the holding surface 3 from the mounting plane M, but also serves to secure the stop 6 in the corresponding stop receptacle 8, 9 of the locking holder 10. As has already been described above, the holding shoe 5 can be latched to the holding element 2 and/or to the supports 1.1. In this latching position, the receptacles 5.4 arranged between the spring arms 5.3 and the limbs 5.1, 5.2 grip the two upper guide elements 6.3 of the stop 6 and thus hold them in the recesses 8.1, 9.1 of the respective stop receptacle 8, 9. The stop 6 is then received in a form-fitting manner between the holding shoe 5 and the mounting element 1 and the holding element 2. Furthermore, the stop receptacles 8, 9 additionally also have a contact surface 8.2, 9.2, which are each part of one of the supports 1.1. Said contact surfaces 8.2, 9.2 serve as an additional support and thus ensure that the forces acting on the guide elements 6.3 are reduced, in particular when the locking latch 7 strikes against the stop 6. The sectional view of FIG. 12 once again shows how the guide elements 6.3 are received in the mounting receptacle 1, the holding element 2 and the holding shoe 5. The holding shoe 5 gripping the holding element 2 presses the guide element 6.3 both above and below the holding element 2 into the corresponding recess 8.1, 9.1 of the respective stop receptacle 8, 9 and then ensures, when it is latched to the holding element 2 or to the supports 1.1, that the stop 5 is held securely in the corresponding stop receptacle 8, 9.

Figure 11:
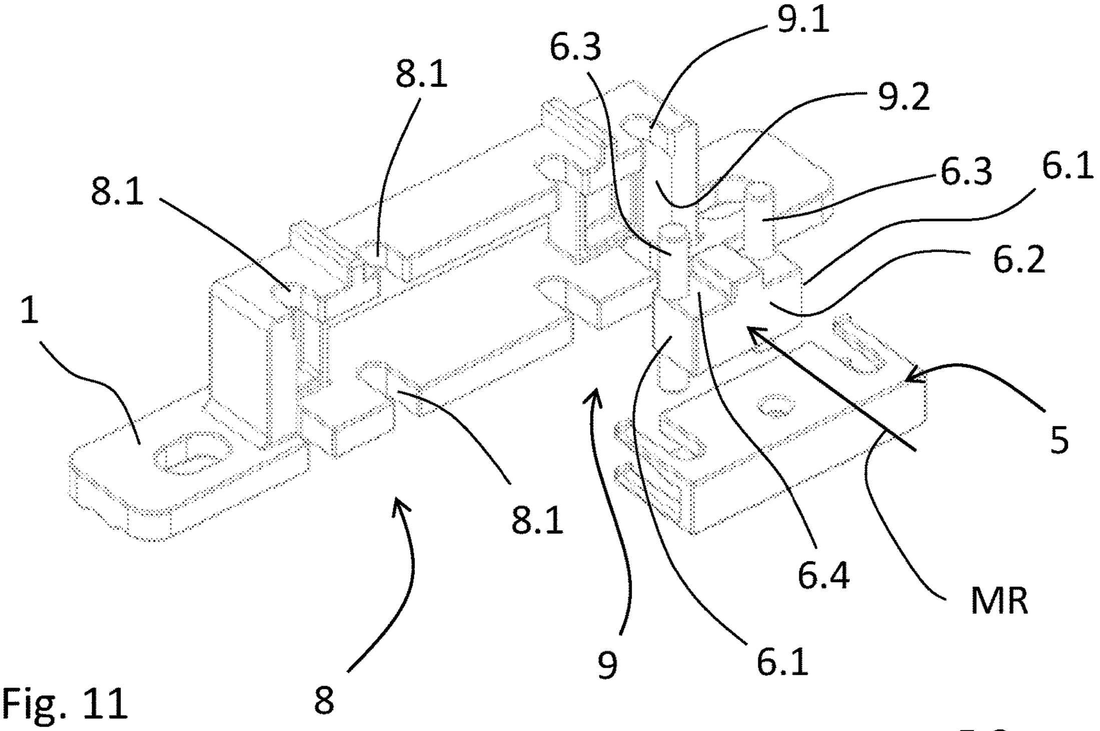
FIG. 11 shows a perspective side view of a locking holder when inserting the stop and when attaching the holding shoe.
Figure 12:
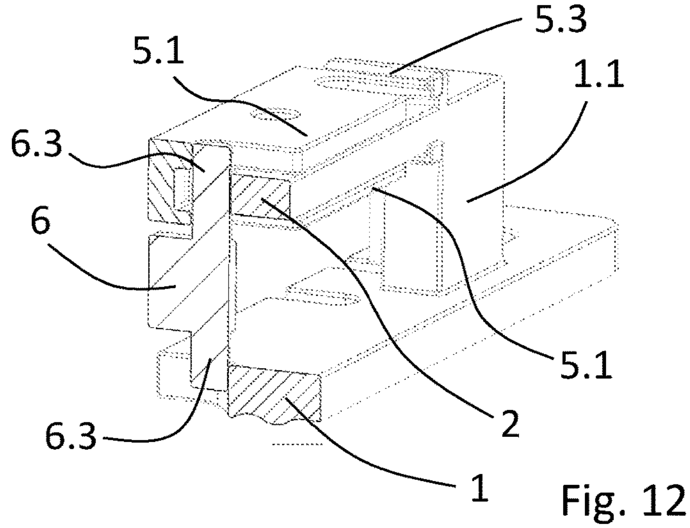
FIG. 12 shows a perspective sectional view through a locking holder with a stop and a holding shoe in a first embodiment.

Furthermore, it can be seen in particular in FIG. 11 that the stop 6 has two offsets 6.4 at the upper end. When the stop 6 is held by the holding shoe 5 in the stop receptacle 8, 9, the lower spring element 5.3 located on the side of the stop receptacle 8, 9 used lies in the offset 6.4, which faces toward the center of the locking holder 10. The offset 6.4 thus ensures that the corresponding guide element 6.3 can also be gripped by the lower receptacle 5.4 below the holding element 2. This can also be seen in the illustration of FIG. 2, in which the stop 6 is arranged in the right-hand stop receptacle 9. If the stop 6 is arranged in the left-hand stop receptacle 8, the holding shoe 5 grips the correspondingly other guide element 6.3 of the stop 6.

A further embodiment of the stop 6 and the stop receptacles 8, 9 will now be described below with reference to the illustrations in FIGS. 10*a* to 10*d*. In this embodiment, the holding shoe 5 is longer than the holding shoe 5 shown in FIGS. 2 and 11, and the holding shoe 5 in this embodiment also has only two spring arms 5.3 and not four spring arms 5.3. The stop 5 also further differs from the stop 5 described above in that it has only two guide elements 6.3 and the stop receptacles 8, 9 accordingly likewise have only two recesses 8.1, 9.1, one in the mounting element 1 and one in the holding element 2. The mounting element 1 and the holding element 2 are therefore more stable in this configuration.

Figure 13:
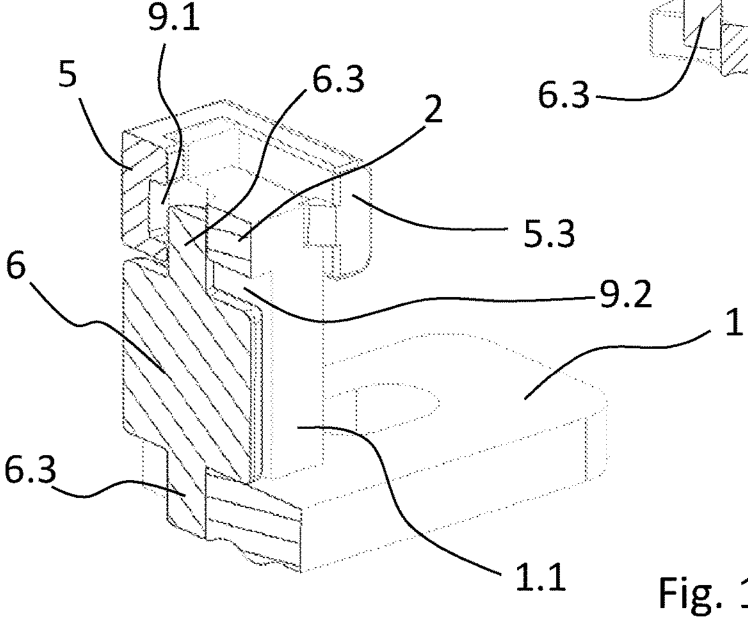
FIG. 13 shows a perspective sectional view through a locking holder with a stop and a holding shoe in a second embodiment.

The holding shoe 5 likewise has a receptacle 5.4 arranged between the spring arms 5.3 and the limbs 5.1, 5.2. In this embodiment, however, the receptacle 5.4 does not serve to hold the guide elements 6.3 in the respective recess 8.1, 9.1, but rather also to grip the supports 1.1 laterally in the manner of a clamp, as already described with regard to the holding element 5. In contrast to the embodiment with the four recesses 8.1, 9.1 per stop receptacle 8, 9, the contact surface 8.2, 9.2 is of greater importance in this embodiment. This is because the contact surface 8.2, 9.2 ensures that the stop 6 does not rotate when the locking latch 7 strikes against it. A corresponding sectional view through the stop 6 and the locking holder 10 is shown in FIG. 13.

Figure 10D:
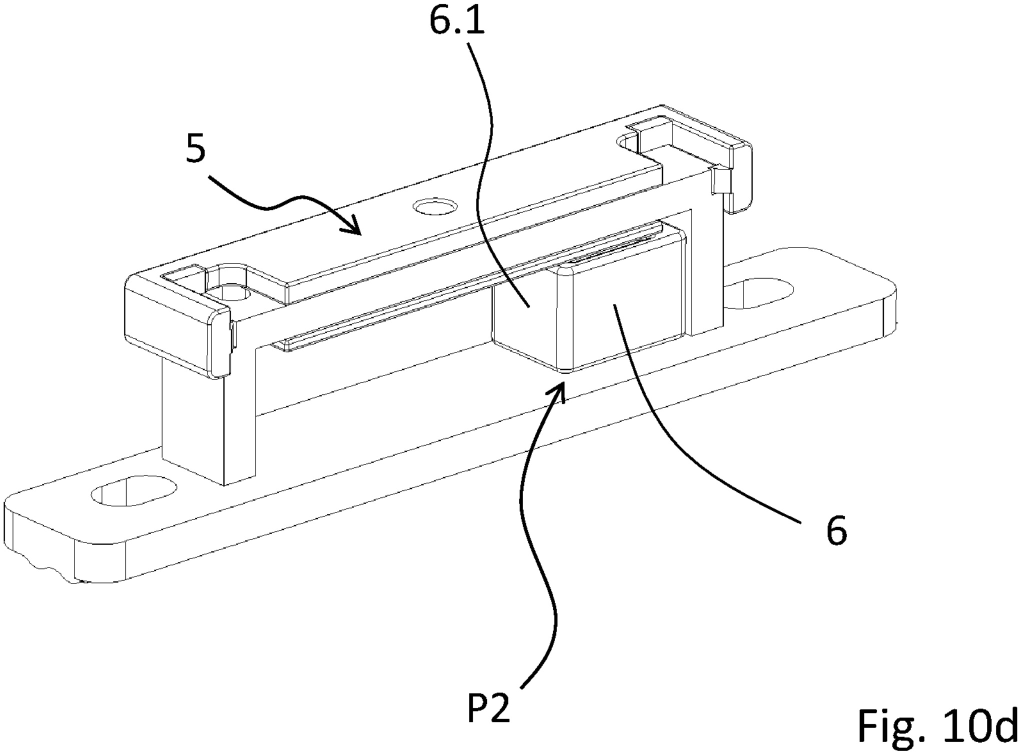

As can also be seen in FIGS. 10*a* to 10*d*, the stop 6 can be switched to and fro between the two stop receptacles 8, 9 as desired. In the illustration of FIG. 10*a*, the stop 6 is initially in the first stop position P1 in the stop receptacle 8. After the holding shoe 5 has been removed from the holding element 2, the stop 6 can be removed from the stop receptacle 8 by hand, rotated through 180 degrees and then inserted into the stop receptacle 9. Finally, the holding shoe 5 is pushed back onto the holding element 2 in order to secure the stop 6 in the stop receptacle 9. This position is shown in FIG. 10*d*.

The unlocking of the lock 14 will now be explained in more detail below with reference to FIGS. 14*a* to 14*d*. In the position shown in FIG. 14*a*, the lock 14 or the locking latch 7 is in the locking position V. The stop 5 is arranged on the locking holder 10 and is inserted in the stop receptacle 9 in the stop position P1. In the locking position V, the latch element 7.1 of the locking latch 7 rests against a locking stop surface 6.1. This stop surface 6.1 can also be seen in FIG. 11, for example. This is the stop surface 6.1 against which the locking latch 7 rests in the locking position V. Depending on the stop position P1, P2, this locking stop surface 6.1 is arranged either on the left or right of the stop 6 and always faces toward the center of the locking holder 10.

Figure 14A:
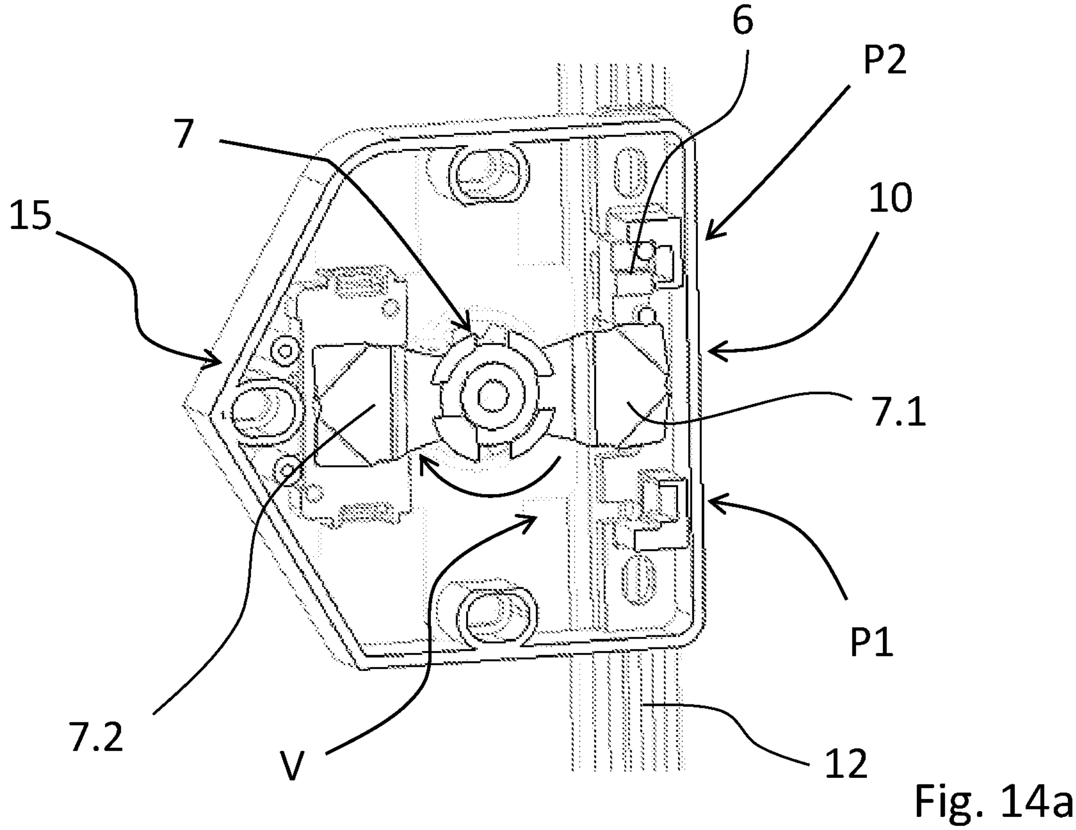
FIGS. 14*a* to 14*d* show different perspective sectional views when unlocking the lock.
Figure 14B:
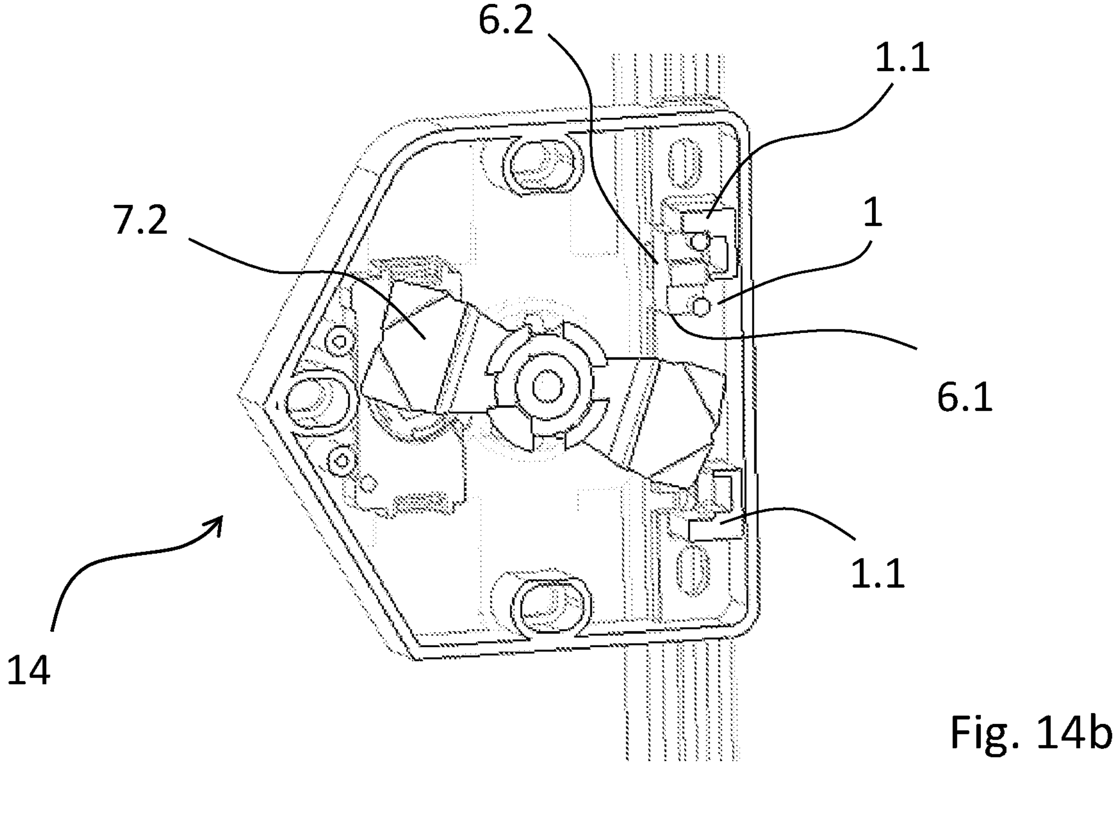
Figure 14C:
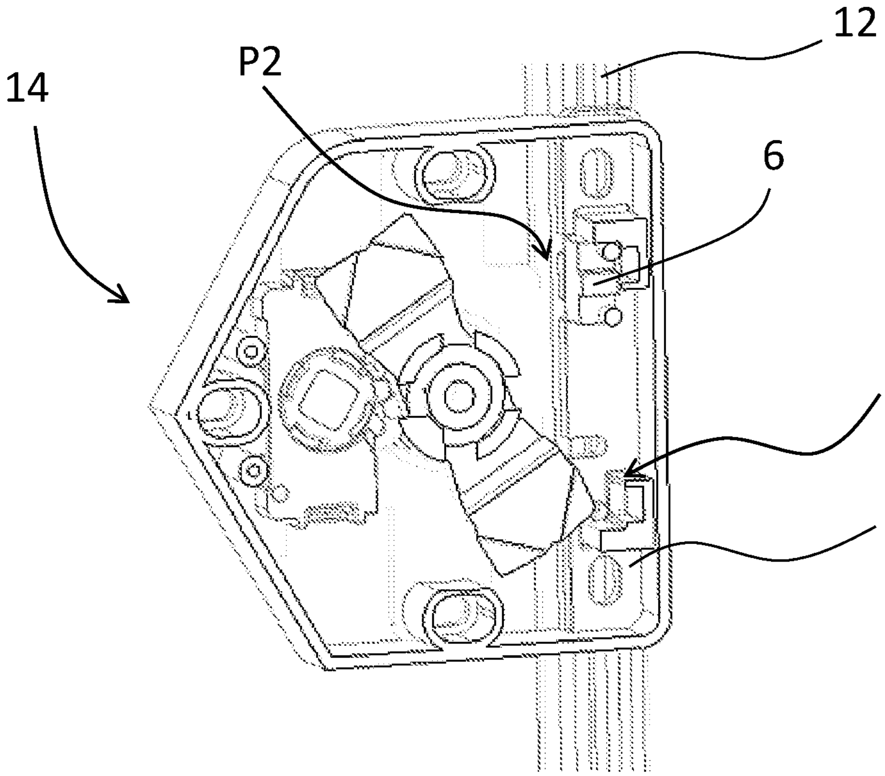
Figure 14D:
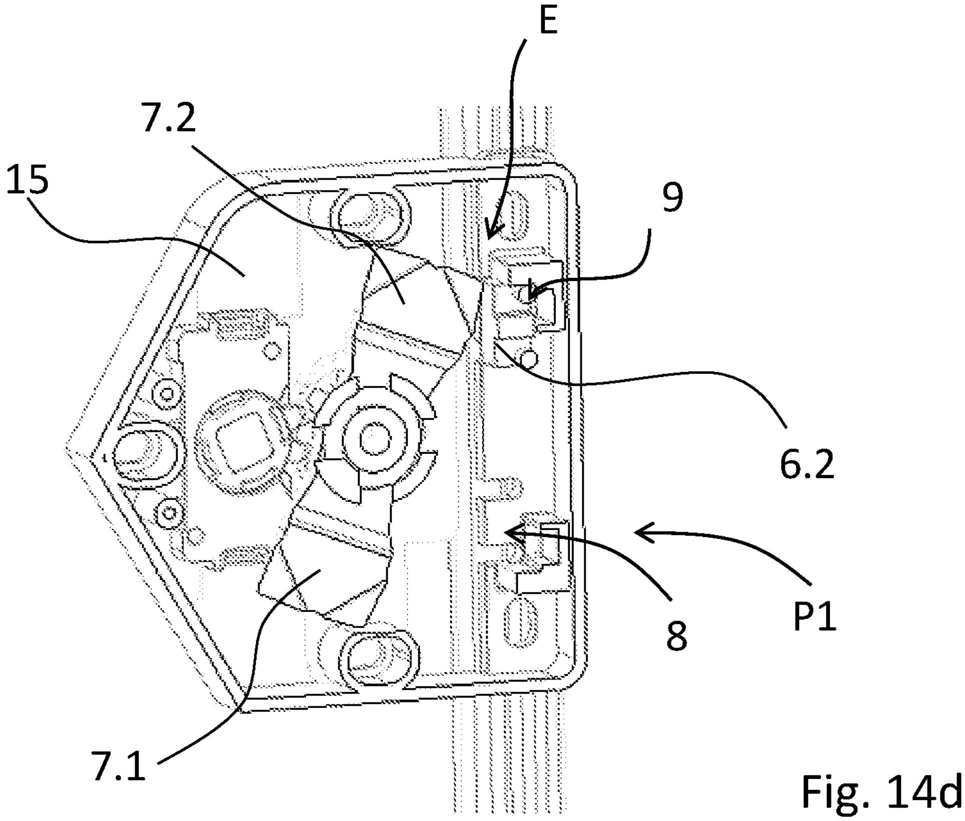

For unlocking purposes, the locking latch 7 must now be rotated clockwise, as indicated by an arrow in FIG. 14*a*. During this rotational movement, it passes through the positions shown in FIGS. 14*b* and *c*. As soon as the latch element 7.1 has then been pivoted out of the locking holder 10 and the latch element 7.1 no longer engages behind the holding surface 3 of the locking holder 10, the door 11 can be opened. This unlocking position E is shown in FIG. 14*d*. It can be seen that, in this position, the latch element 7.2 strikes against the stop 6 or against the unlocking stop surface 6.2 and, as a result, further rotation of the locking latch 7 in the unlocking direction is no longer possible. The unlocking stop surface 6.2 can also be seen in the illustration of FIG. 11.

If the stop 6 is now pulled out of the stop receptacle 9 and inserted into the stop receptacle 8, a different stop pattern results. Starting from the position in FIG. 14*d*, the locking latch 7 is then rotatable further in the clockwise direction until the latch end 7.2 then strikes against the stop 6 located in the stop position P1. In this locking position V, the latch element 7.2 then rests against the locking stop surface 6.1 of the stop. However, the locking stop surface 6.1 is not the same surface against which the latch element 7.1 strikes when the stop 6 is in the stop position P1, as has been described above, but rather the locking stop surface 6.1 lies opposite this surface, as this can also be seen with reference to FIG. 11, for example. If the locking latch 7 is then rotated counterclockwise from this position into the unlocking position E, the latch element 7.1 strikes against the unlocking stop surface 6.2 of the stop 6 and thus limits further rotation of the locking latch 7.

By repositioning the stop 6 between the two stop receptacles 8, 9, the rotational movement of the locking latch 7 can thus be controlled. Since, depending on the stop position, the latch element 7.2 and the latch element 7.1 engage behind the holding surface 3 of the locking holder 10 and the locking holder 10 is connected to the handle lever 13, the position of the handle lever 13 can then thus also be adjusted in the locking position V and the unlocking position E.

REFERENCE SIGNS

1 Mounting element
1.1 Support
2 Holding element
2.1 Guide
3 Holding surface
5 Holding shoe
5.1 Limb
5.2 Limb
5.3 Spring arm
5.4 Receptacle
6 Stop
6.1 Locking stop surface
6.2 Unlocking stop surface
6.3 Guide element
6.4 Offset
7 Locking latch
7.1 Latch element
7.2 Latch element
8 Stop receptacle
8.1 Recess
8.2 Contact surface
9 Stop receptacle
9.1 Recess
9.2 Contact surface
10 Locking holder
11 Door
12 Door frame
13 Handle lever
14 Lock
15 Latch housing
A1 Distance
A2 Distance
M Mounting plane
MR Mounting direction
M1 Mounting position
M2 Mounting position
V Locking position
E Unlocking position
P1 Stop position
P2 Stop position

What is claimed is:

1. A locking holder with a mounting element via which the locking holder can be fastened to a door frame in a mounting plane, the locking holder comprising:

a holding shoe having a holding surface which is arranged spaced apart from and parallel to the mounting plane and configured to be engaged behind by a door-side locking latch in order to lock the door, wherein the holding shoe is configured to be fastened releasably to a holding element to set a distance of the holding surface with respect to the mounting plane, wherein the holding shoe has two limbs of different thickness, wherein the holding element is connected to the mounting element via at least one support, wherein the holding shoe has at least a pair of spaced apart spring arms configured to latch to the holding element and/or the support, and wherein each spring arm has a latching lug at an end thereof, extending in a direction perpendicular to a length of the spring arm, and configured such that each latching lug can fit over the holding element and/or the support, or fit into a notch thereof, to releasably fasten the holding shoe to the holding element and/or the support.

2. The locking holder as claimed in claim 1, wherein the holding shoe is plugged onto the holding element.

3. The locking holder as claimed in claim 1, wherein the holding shoe is configured to be fastened to the holding element in either a first or a second mounting position to set the distance.

4. The locking holder as claimed in claim 3, wherein the holding shoe is rotated in one mounting position by 180 degrees in relation to the other mounting position.

5. The locking holder as claimed in claim 3, wherein the distance of the holding surface with respect to the mounting plane is smaller in the first mounting position than in the second mounting position.

6. The locking holder as claimed in claim 3, wherein each latching lug extends in the same direction from the associated spring arm such that at least two latching lugs can releasably fasten the holding shoe to the holding element and/or the support regardless of the mounting position of the holding shoe.

7. The locking holder as claimed in claim 1, wherein a distance of the holding surface with respect to the mounting plane can be set in a perpendicular direction.

8. The locking holder as claimed in claim 1, wherein the holding element is connected to the mounting element via two supports.

9. The locking holder as claimed in claim 1, wherein the holding shoe extends an entire length of the holding element.

10. The locking holder of claim 1, wherein the holding shoe is produced from a POM plastic compound.

11. The locking holder as claimed in claim 1, wherein the mounting plane is oriented perpendicular to a direction in which the locking holder is configured to be fastened to the door frame.

12. The locking holder as claimed in claim 1, wherein the locking holder is coupled to the door frame, and wherein the mounting plane is parallel to that portion of the door frame to which the locking holder is coupled.

13. The locking holder as claimed in claim 1, wherein the each spring arm is located at an opposite end of the holding shoe along a length thereof.

14. The locking holder as claimed in claim 1, wherein the holding shoe is shaped generally as a rectangular prism, and wherein a spring arm is located at each corner of a face of the rectangular prism.

15. The locking holder as claimed in claim 1, wherein each spring arm has a length sufficient to span a length of the holding element and/or the support, to enable each latching lug to fit over the holding element and/or the support, or fit into a notch thereof, to releasably fasten the holding shoe to the holding element and/or the support.

16. A locking holder with a mounting element via which the locking holder can be fastened to a door frame in a mounting plane, the locking holder comprising:

a holding shoe having a holding surface which is arranged spaced apart from and parallel to the mounting plane and configured to be engaged behind by a door-side locking latch in order to lock the door, wherein the holding shoe is configured to be fastened releasably to a holding element to set a distance of the holding surface with respect to the mounting plane, wherein the holding shoe has two limbs of different thickness, wherein the holding element has a guide for the holding shoe, wherein the guide includes two parallel, spaced apart raised webs, positioned on an upper surface of the guide and extending in a direction parallel to a movement of the holding shoe when the holding shoe is releasably fastened to the holding element, and wherein the raised webs are spaced apart by a distance sized to closely receive the holding shoe therebetween.

17. A locking holder with a mounting element via which the locking holder can be fastened to a door frame in a mounting plane, the locking holder comprising:

a holding shoe having a holding surface which is arranged spaced apart from and parallel to the mounting plane and configured to be engaged behind by a door-side locking latch in order to lock the door, wherein the holding shoe is configured to be fastened releasably to a holding element to set a distance of the holding surface with respect to the mounting plane, wherein the holding shoe has two limbs of different thickness, wherein the holding shoe has a receptacle for receiving a stop to thereby limit an insertion of the holding shoe onto the holding element, wherein the receptacle extends entirely through a thickness of the holding shoe, wherein the holding shoe has a supplemental receptacle for receiving the stop in a supplemental position to thereby limit the insertion of the holding shoe onto the holding element in the supplemental position, and wherein the supplemental receptacle extends entirely through the thickness of the holding shoe.

* * * * *